United States Patent
Sharkan et al.

(10) Patent No.: US 9,422,022 B2
(45) Date of Patent: Aug. 23, 2016

(54) MULTI-FUNCTIONAL PERSONAL MOBILITY DEVICE COMPACTING TO BRIEFCASE SIZE

(71) Applicants: Arnold L. Sharkan, Vernon Hills, IL (US); Kenneth L. Goldberg, Highland Park, IL (US); Benjamin Guler, Evanston, IL (US)

(72) Inventors: Arnold L. Sharkan, Vernon Hills, IL (US); Kenneth L. Goldberg, Highland Park, IL (US); Benjamin Guler, Evanston, IL (US)

( * ) Notice: Subject to any disclaimer, the term of this patent is extended or adjusted under 35 U.S.C. 154(b) by 0 days.

(21) Appl. No.: 14/614,620

(22) Filed: Feb. 5, 2015

(65) Prior Publication Data
US 2015/0246705 A1 Sep. 3, 2015

Related U.S. Application Data

(60) Provisional application No. 61/937,391, filed on Feb. 7, 2014.

(51) Int. Cl.
  *B62K 15/00* (2006.01)
  *B62K 11/02* (2006.01)
  *B62K 3/00* (2006.01)

(52) U.S. Cl.
  CPC .............. *B62K 15/008* (2013.01); *B62K 3/002* (2013.01); *B62K 11/02* (2013.01); *B62K 2204/00* (2013.01)

(58) Field of Classification Search
  CPC ...... B62K 15/008; B62K 3/002; B62K 11/02; B62K 2204/00
  See application file for complete search history.

(56) References Cited

U.S. PATENT DOCUMENTS

| | | | | |
|---|---|---|---|---|
| 3,079,172 | A * | 2/1963 | Burwell | B62K 15/008 180/208 |
| 3,314,494 | A * | 4/1967 | Weitzner | A45C 5/14 180/208 |
| 6,273,442 | B1 * | 8/2001 | Fallon et al. | B62K 15/008 280/287 |
| D644,569 | S * | 9/2011 | Meyers | D12/110 |
| 8,282,113 | B2 * | 10/2012 | Veal et al. | A45C 5/14 280/43.1 |
| D670,618 | S * | 11/2012 | Yamazaki | D12/110 |
| 2004/0094919 | A1 * | 5/2004 | Roder et al. | A45C 5/14 280/30 |
| 2005/0285357 | A1 * | 12/2005 | Lin | A45C 9/00 280/47.26 |
| 2011/0155527 | A1 * | 6/2011 | Veal et al. | A45C 5/14 190/18 A |
| 2013/0306392 | A1 * | 11/2013 | Schaap | B62K 3/002 180/220 |

FOREIGN PATENT DOCUMENTS

CN 102285414 A * 12/2011 ................. B62J 9/00

* cited by examiner

*Primary Examiner* — Faye M Fleming
(74) *Attorney, Agent, or Firm* — MU Patents; Timothy Marc Shropshire; Garrett James O'Sullivan

(57) ABSTRACT

A light weight and portable personal mobility device, having an energy source capable of propelling an adult rider within an urban indoor and/or outdoor environment that is small enough to be easy to bring onto public transport vehicles. The energy source may be electricity or the rider themselves. The device, powered or non-powered, compresses from a small scooter in ride mode to, in a transportable state, a briefcase sized device. The outer casing of the device includes space within it for the integral components of the device and provides a means of housing components and transporting the device. A further embodiment/mode of the device, in addition to the retracted "briefcase mode", and the deployed "ride mode", would be a "trolley mode", whereas the device, when in "trolley mode", is pulled by a long handle, similar to the way "wheeled airline type luggage devices" are pulled around airports and numerous other locations.

8 Claims, 3 Drawing Sheets

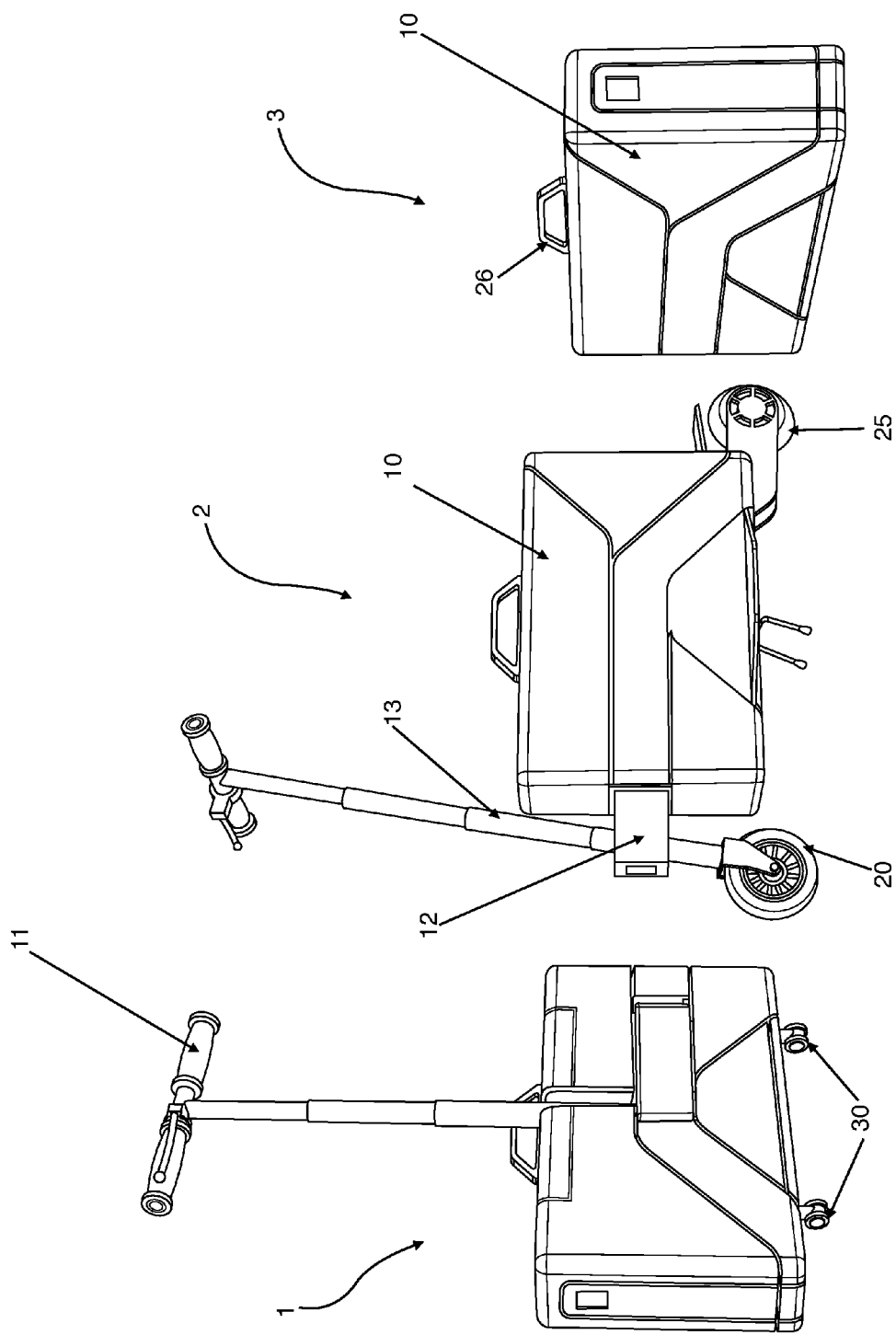

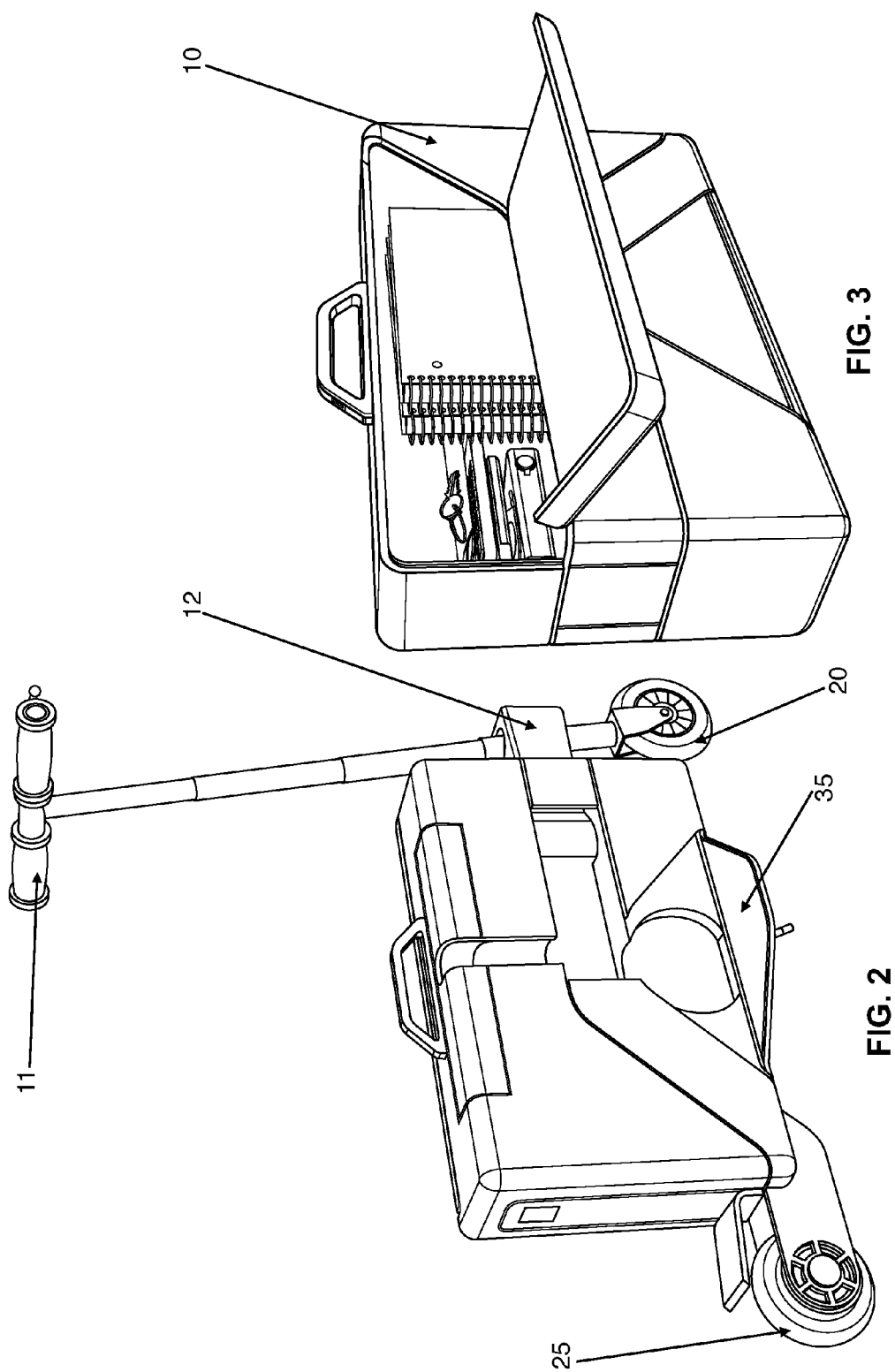

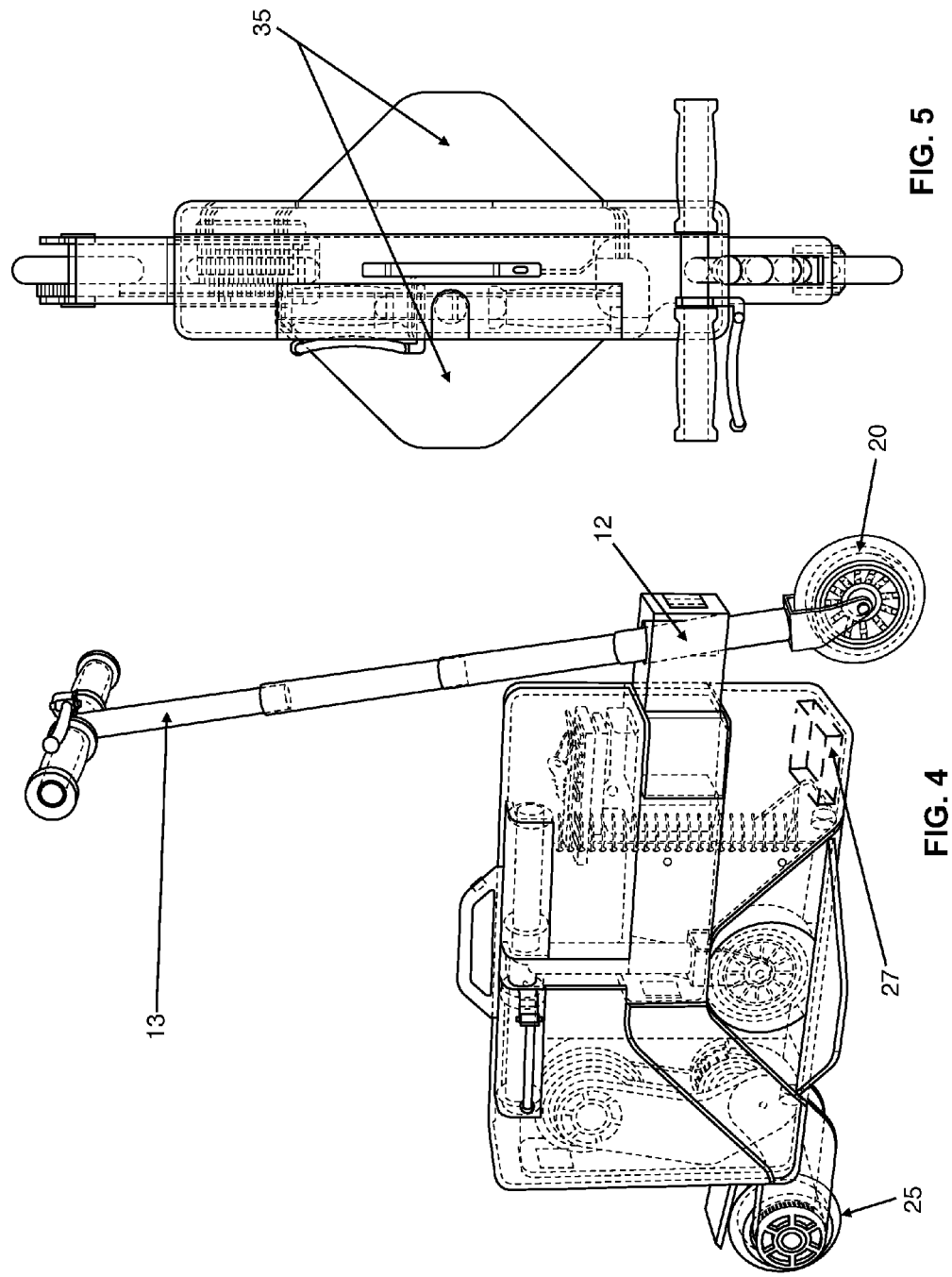

MULTI-FUNCTIONAL PERSONAL MOBILITY DEVICE COMPACTING TO BRIEFCASE SIZE

FIELD OF INVENTION

The present invention concerns a motorized and/or non-motorized personal mobility transport device. More particularly the present invention concerns personal mobility devices that are portable, readily expandable for use and compacted for storage, are light-weight and have a briefcase look and size when in a stored position. The device further may have a storage area, integrated into itself, for storage of personal items of the user.

BACKGROUND OF THE INVENTION

The goal of the invention is to replace or reduce personal auto, bus, and taxi use and thereby reduce traffic congestion in urban areas, with an "Energy Neutral" (i.e.: "zero emissions/ zero fossil fuel use") "single person mover" vehicle, which as an alternative vehicle, creates a smaller "urban footprint" as compared to a personal automobile, bus, or taxi.

Prior to this invention, all other personal mobility transport devices have failed to provide solutions to the need for a complementary commuter vehicle for the "first mile trip" (i.e. from home to train station or bus stop) and for the "last mile trip" (i.e: leaving a train station or bus stop to any destination not within ones desired walking distance), that are small enough to be accepted with regular usage of public transit, such, but not limited to, train, bus and subway. While other attempts have been made to create viable complementary commuter devices, such devices have been too heavy to be portable and too large to be accepted in public transport vehicles during rush hours.

In the case of some more recent devices where some portability is allowed, these devices (known as "single wheel electric unicycles" or "single or dual wheel light SEGWAY") are more portable and may be accepted on certain public transport vehicles, but all require more advanced balancing skills than most consumers have. Further, all of the more recent devices rely on gyroscopic sensors to control these devices. These devices many times cause a multitude of accidents and serious injuries to those who use these devices. For example, James Heselden, a former owner of the SEGWAY company died in 2010 after losing control of such a device.

BRIEF SUMMARY OF THE INVENTION

In accordance with the present invention, a personal mobility device having a small electric motor powered by a battery pack, or any other power source, coupled to a structurally significant frame capable of supporting these components along with an adult rider, having adequate portability and concealment. The device provides an exoskeleton structure, in the form of a high strength shell structure, that is used for concealment and provides structural elements of the device. The shell structure, which is formed as a briefcase style case, provides, when used for storage, a means to store the device's components as well as some personal items of the user. Elements of the device of the present invention are designed to be stored within the briefcase style case and be readily accessible to the rider, when taken from the briefcase device.

A more detailed explanation of the invention is provided in the following description and is illustrated in the accompanying drawings.

BRIEF DESCRIPTION OF THE DRAWINGS

FIGS. 1a, 1b and 1c: Composite view three modes; This figure shows a composite view of three operational modes; Trolley Mode, Ride Mode and Briefcase Mode.

FIG. 2: Fully Deployed Ride Mode, Side Isometric view;

FIG. 3: Briefcase Mode, internal storage view;

FIG. 4: Fully Deployed Ride Mode and Briefcase Mode, Side Isometric Skeletal view;

FIG. 5 Fully Deployed Ride Mode and Briefcase Mode, Top Skeletal view;

DETAILED DESCRIPTION OF THE ILLUSTRATIVE EMBODIMENT

While the present invention is susceptible of embodiment in various forms, there is shown in the figures a number of presently preferred embodiments that are discussed. It should be understood that the present disclosure is to be considered as an exemplification of the present invention, and is not intended to limit the invention to the specific embodiments illustrated. If should further be understood that the title of this section of this application ("Detailed Description of the illustrative embodiment") relates to a requirement of the United States Patent Office, and should not be found to limit the subject matter disclosed herein.

FIGS. 1-5 shows detail of the embodiments of the device of the present invention. FIGS. 1a, 1b and 1c show a composite view of three operational modes; Trolley Mode 1, Ride Mode 2 and Briefcase Mode 3. FIG. 1b shows the device with the front 20 and rear wheels 25 unfolded and the steering wheel extended to full length. FIG. 1c shows the device in compacted mode with the front wheels 20, rear wheels 25 and steering folded inside into the briefcase case shape for transport on public transport vehicles, storage or carrying by its handle 26. Picture 1a shows the device with small "luggage" wheels 30 and an extended pull handle 11 for easily manually transporting the device. FIG. 2 shows the fully deployed ride mode, It shows a perspective view of the fully deployed present invention in the ride mode and shows an opening on the side for fitting the front wheel 20 and steering arm 12 in Briefcase Mode. FIG. 2 also shows the right side unfolded standing platform 35. The left side has a similar platform. FIG. 3 is a left side perspective view of the present invention showing the internal access door 10 in its open position showing the internal storage area. FIG. 4 is a side isometric skeletal view; the solid lines shows the device in fully deployed mode. The dotted lines show the rear wheel being pivoted up and into the external case, where it will no longer be visible. The dotted lines also show the steering column 13 having been collapsed down and folded sideways into the external case. FIG. 5 shows a top skeletal view; FIG. 5 shows both the same deployed and collapsed locations of the wheels and steering arm as in FIG. 4.

Although illustrative embodiments of the invention have been shown and described, it is to be understood that various modifications and substitutions may be made by those skilled in the art without departing from the novel spirit and scope of the invention.

In accordance with the present invention, a personal mobility device having a small electric motor powered by a battery pack 27, or any other power source, coupled to a structurally significant frame capable of supporting these components along with an adult rider, having adequate portability and concealment. The device provides an exoskeleton structure, in the form of a high strength shell structure, that is used for concealment and provides structural elements of the device.

The shell structure, which is formed as a briefcase style case, provides, when used for storage, a means to store the device's components as well as some personal items of the user. Elements of the device of the present invention are designed to be stored within the briefcase style case and be readily accessible to the rider, when taken from the briefcase device.

In the use of one embodiment of the device of the present invention, the device user pulls on or depresses the carrying handle lock, then rotates said handle, which will deploy the front idle wheel, the rear power assist wheel, the left and right footrests as well as the steering column. The deployment action will occur in a time frame of under 30 seconds. Additional considerations for this embodiment: A series of internal mechanisms that transfer power from handle twisting action and direction are needed for both wheels, both footrests, and the steering column deployment. Electronic actuators may be used to assist and deploy these actions. Case panels that are part of the "briefcase" outer skin that hide the wheels and steering column, will be moved out of the way by the aforementioned deploying structures. Likewise, during retraction of these afore mentioned structures, the panels, already having been moved out of the way during deployment of these structures, will return to their original positions, after a retraction, and remain in a fixed position, until a re-deployment of the wheels, footrests, and steering column. No tools are needed.

In another embodiment, a handle can be deployed from the device while it is in a compact, folded briefcase shape to a trolley mode that also includes two small wheels, allowing a user to pull the device, similar to the way wheeled luggage is pulled, thus avoiding having to carry the folded device for long distances by means of its small handle, at top of case. In another embodiment of the device, such device is powered by electricity provided by a battery or batteries. In still another embodiment a fuel cell or fuel cells are utilized to provide power. It will be understood that any manner of drive force which can be adapted to the size, weight and power requirements of the device of the present invention, can be utilized herein without departing from the novel scope of the present invention.

In yet another embodiment of the device in the present invention, the device user presses a button on or near the briefcase mode handle, and then "pulls up" on the concealed steering column to deploy outward, whereas this action deploys the front wheel, the rear power assist wheel, and the left and right footrests. These aforementioned device components (front and rear wheel, left and right footrests) deploy due to a series of internal mechanisms that transfer power from the user action; "pressing a button and pulling up and outward on the concealed steering column", to cause deployment of the device's front idle wheel, rear power assist wheel, and left and right footrests. In yet another embodiment, all of expansion and contraction activities are done manually. The device can readily be used indoors or outdoors, depending on the type power source utilized and resulting emissions generated.

We claim:

1. A personal mobility device compactable to a briefcase size, having:
    a. a body;
    b. at least one pivoting steering arm foldable within the body in trolley position;
    c. at least one rear drive wheel slidable within the body;
    d. a collapsible trolley handle extending upwardly, passing through the pivoting steering arm, and terminating in a front wheel;
    e. wherein the device is configurable in a trolley position and a ride position, wherein in the trolley position the pivoting steering is collapsed, the trolley handle protrudes from the body, and the front and drive wheels are stored within the body, and wherein in the ride position the pivoting steering arm is extended in front of the body, the handle passes through the steering arm and terminates in a wheel, and the drive wheel extends from the rear.

2. The personal mobility device of claim 1 further comprising foldable standing platforms that extend horizontally from the body in the ride position and fold into the body in the trolley position.

3. The personal mobility device of claim 1 wherein the trolley handle is steeringly connected to the front wheel.

4. The personal mobility device of claim 1 wherein the handle collapses into the body to transform the device from the trolley position to a briefcase position.

5. The personal mobility device of claim 1 wherein in the trolley position at least two small wheels protrude from beneath the device.

6. The personal mobility device of claim 1 wherein the rear wheel is electrically-powered.

7. The personal mobility device of claim 6 wherein the body contains a battery configured to provide power to the rear wheel.

8. The personal mobility device of claim 1 wherein the handle collapses next to the body to transform the device from the trolley position to a briefcase position.

* * * * *